April 28, 1959 V. D. ROOSA 2,883,934
PRESSURE RESPONSIVE VALVE FOR FUEL PUMPS
Filed April 4, 1952 2 Sheets-Sheet 1

INVENTOR.
VERNON D. ROOSA
BY
Lindsey and Prutzman
ATTORNEYS

April 28, 1959  V. D. ROOSA  2,883,934
PRESSURE RESPONSIVE VALVE FOR FUEL PUMPS
Filed April 4, 1952  2 Sheets-Sheet 2

INVENTOR.
VERNON D. ROOSA
BY
Lindsey and Pritzman
ATTORNEYS

United States Patent Office 2,883,934
Patented Apr. 28, 1959

2,883,934

PRESSURE RESPONSIVE VALVE FOR FUEL PUMPS

Vernon D. Roosa, West Hartford, Conn.

Application April 4, 1952, Serial No. 280,573

10 Claims. (Cl. 103—42)

The present invention relates generally to fuel pumps and more particularly to a pressure responsive valve having particular usefulness for installation between the pickup pump and charge pump of a fuel feed system for internal combustion engines.

In a fuel feed system for internal combustion engines it frequently is desirable to employ a pickup pump and charge pump in tandem, the function of the pickup pump being to draw fuel from the fuel tank or reservoir and feed it to the charge pump which in turn transfers the fuel to the engine cylinders under greatly increased pressure. In such an arrangement it is desirable to provide some means for regulating the output of the pickup pump and also to by-pass the pickup pump during a priming operation, particularly when a filter is installed between the two pumps.

It is an object of the present invention to provide a valve of simple, economical and compact construction which will serve to regulate the output of a pickup pump and which will also permit the pickup pump to be bypassed as during a priming operation, for example.

A further object of the invention is to provide a valve of the character described which will be responsive to fluid pressure and arranged so that it will function automatically without requirement for any manual operation.

Another object is to provide such a valve which will be efficient in operation and reliable in service so that it will perform its intended functions adequately and dependably over long periods of time without requiring repair or replacement.

Other objects will be in part obvious and in part pointed out more in detail hereinafter.

The invention accordingly consists in the features of construction, combination of elements and arrangements of parts which will be exemplified in the construction hereafter set forth and the scope of the application of which will be indicated in the appended claims.

Figure 1:
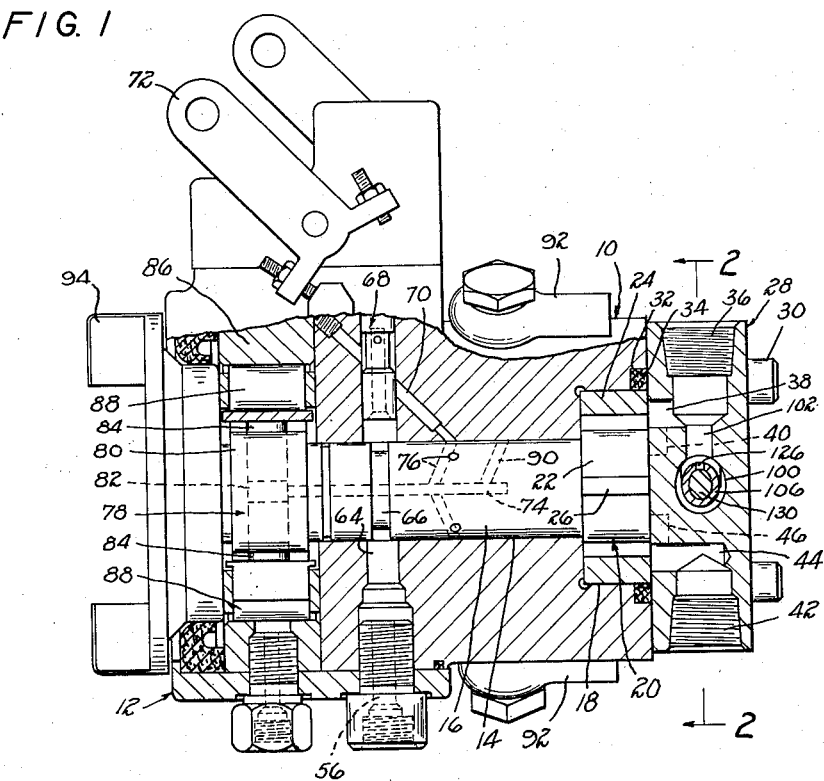
Fig. 1 is a side view, partly in cross section, of an exemplary fuel pump comprising a pickup pump and charge pump and provided with an embodiment of the valve of the present invention.

Referring to the drawings, there is shown in Fig. 1 an exemplary fuel pump which comprises a main pump body 10 and a cylindrical housing 12 connected thereto in telescoping fashion. The main body 10 is provided with an axial bore 14 in which is rotatably positioned a fuel distributing member 16. The main body 10 has a counterbore 18 as viewed in Fig. 1 in which is received a pickup pump indicated generally by the reference numeral 20. The pickup pump 20 illustrated is of the sliding vane type and includes a rotor 22 which is fixed to the fuel distributing member 16 for rotation therewith and a stationary member 24 fixed in the cavity provided by the counterbore 18. A vane 26 is slidably mounted in the rotor 22.

The end of the main body 10 is covered by an end plate or head 28 which is clamped to the main body by suitable means such as the bolts 30. A sealing ring 32 of resilient material may be provided in an annular groove 34 to provide a fluid-tight seal between the end plate 28 and the main body 10. The end plate 28 is provided with an inlet for the pickup pump 20 which consists of a transversely directed threaded inlet port 36, a passageway 38 at right angles thereto, and an arcuate cavity 40. An outlet for the pickup pump 20 is provided by a similar arrangement diametrically opposite from the inlet and consists of threaded outlet port 42, passageway 44, and arcuate cavity 46.

Figure 4:
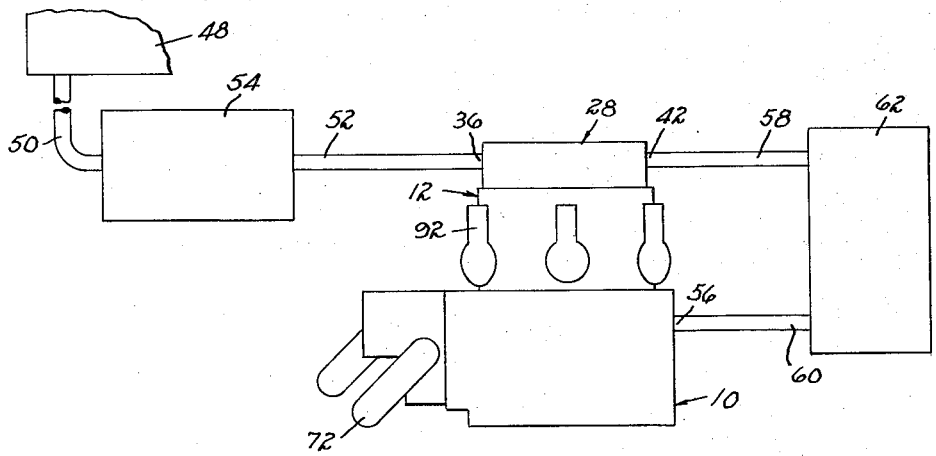
Fig. 4 is a diagrammatic view showing the fuel feed system.

As shown diagrammatically in Fig. 4 of the drawings, the inlet port 36 is adapted to be connected to a fuel tank or reservoir 48, this connection in the diagrammatic view being illustrated by conduits 50 and 52 and filter 54. The outlet port 42 is adapted to be connected to a secondary inlet port 56 in the main fuel pump, this connection being shown in the diagrammatic view as consisting of conduits 58 and 60 and filter 62.

The secondary inlet port 56 communicates with a transverse passageway 64 in the main body portion 10 of the pump which intersects the axial bore 14. The fuel distributing member 16 is provided with an annular groove 66 so that it does not block the passageway 64. Disposed in the transverse passageway 64 at the end opposite from the secondary inlet port 56 is a metering valve denoted generally by the reference numeral 68. The metering valve 68 meters the flow of fuel from the transverse passageway 64 into the diagonal passageway 70, the position of the valve 68 being determined, for example, by a manually controlled operating arm 72.

The fuel distributing member 16 has a longitudinal passageway 74 and a plurality of radially spaced apart inlet ports 76 which are adapted to communicate intermittently in sequence with the diagonal passageway 70 as the fuel distributing member 16 is rotated.

Fixed to the lefthand end of the fuel distributing member 16, as viewed in Fig. 1, there is provided a charge pump indicated generally by the reference numeral 78. The charge pump is mounted in an enlarged head 80 fixed to the fuel distributing member 16 and adapted to be rotated therewith. Disposed in a transverse passageway 82 in the head 80 communicating with the longitudinal passageway 74 are a pair of pistons 84 which are intermittently driven inwardly in timed relationship by a fixed cam 86 and intermediate roller assembly 88. The arrangement is such that when one of the inlet ports 76 is in communication with the diagonal passageway 70 the pistons 84 are permitted to move apart to receive a charge of fuel and then when the inlet port 76 has been moved to a position out of communication with the diagonal passageway 70 the pistons 84 are forced toward each other to expel the charge of fuel. Also communicating with the longitudinal passageway 74 is an outlet port 90 which is brought sequentially into communication with a plurality of outlet passageways (not shown), this being accomplished in timed relationship concurrently with the actuation of the charge pump 78. The outlet passageways referred to communicate with the coupling members 92 arranged about the periphery of the pump body and which are adapted to be connected individually to the engine cylinders of the engine by suitable tubing or conduits (not shown). The charge pump 78, fuel distributing member 16, and the pickup pump 20 are adapted to be rotated by the engine as, for example, by connection to the coupling member 94.

As will be appreciated, the output of pickup pump 20 will vary in accordance with engine speed, whereas the amount of fuel pumped by charge pump 78 will vary over a wide range depending on engine speed and the setting of the valve 68. Furthermore, it is desirable to design the pickup pump 20 to have ample capacity so that it will always furnish sufficient fuel to meet the needs of the charge pump 78 under all conditions of operation. As a result the output of the pickup pump 20 will frequently exceed that required by the charge pump 78 resulting in an undesirable increase in fuel feed pressure. Accordingly, it is desirable to provide some means for limiting the fluid pressure at the output end of the pickup pump 20.

This is accomplished in accordance with the present invention as follows: A transverse passageway 100 is bored into the end plate 28 and it preferably is bored on the diagonal so that it will communicate intermediate its ends with an extension 102 of the threaded inlet port 36 and a bore 104 communicating with the arcuate header passageway 46 on the outlet side of the pump. There is disposed in the passageway 100 an inner tube or valve chamber 106 having a pair of annular bosses 108 and 110 which are grooved at 112 and 114, respectively, to receive sealing rings 116 and 118. The bosses 108 and 110 effectively position the inner tube 106 co-axially within the bore 100. The inner tube 106 is substantially shorter than the bore 100 to accommodate a spiral spring 120 disposed between the inner end of the bore 100 and the inner tube 106. The spring 120 engages against the tube 106 and has its end 121 bent inwardly so as to extend radially across the mouth of the tube 106 for a purpose to be described hereinafter. The inner tube 106 is retained in position by a screw cap 122 closing the outer end of the passage 100.

The boss 108 is situated between the passageway 102 and the opening 104 while the boss 110 is to the other side of the opening 102 opposite from the boss 108. The inner tube 106 has an aperture 124 to the lefthand side of the boss 108, as viewed in Figs. 2 and 3, and a pair of apertures 126 and 128 situated between and adjacent the bosses 108 and 110, respectively. The apertures 124, 126 together form a fuel metering orifice for the valve tube or chamber 106. Slidably mounted in the inner tube 106 is a freely mounted piston 130. Also disposed within the inner tube 106 and situated between the piston 130 and screw cap 122 is a spiral spring 132. In the operation of the valve the lefthand portion of the bore 100, i.e., to the left of the boss 108 as viewed in Figs. 2 and 3, will be subjected to the outlet pressure of the pickup pump 20. In like manner, the righthand portion of the bore 100 will be subject to the pressure existing at the inlet of the pickup pump 20.

Figure 2:
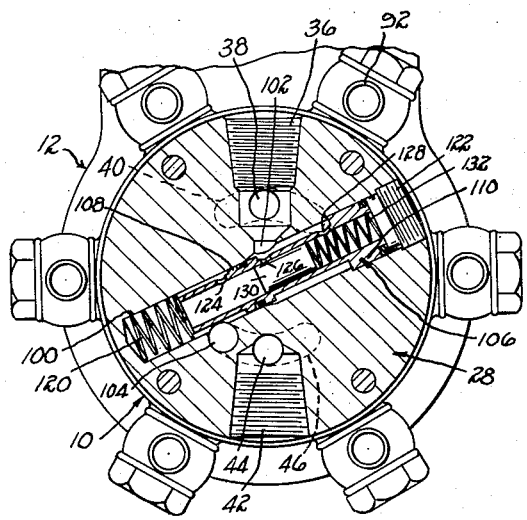
Fig. 2 is a cross-sectional view taken along the line 2—2 of Fig. 1.
Figure 3:
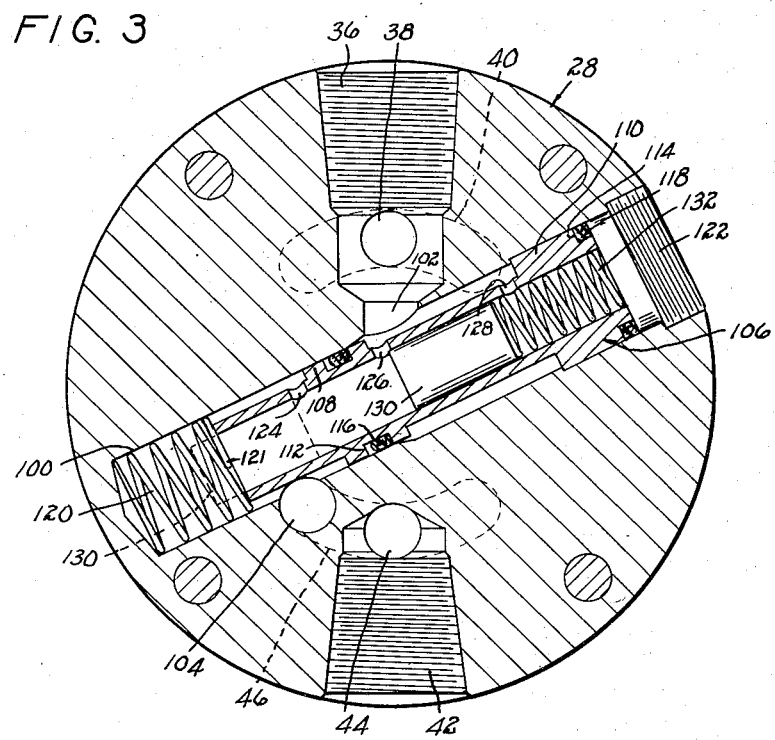
Fig. 3 is an enlarged cross-sectional view of the valve.

When the pump is in normal operation the outlet pressure of the pickup pump 20 of course will exceed the pressure in the inlet of the pump with the result that the fluid pressure in the lefthand end of the bore 100 will force the piston 130 to the righthand end of the inner tube 106 as shown in Figs. 2 and 3 of the drawings. When the outlet pressure of the pickup pump is not excessive the spring 132 will hold the piston 130 in the position shown in Fig. 2 of the drawings with the aperture 126 covered by the periphery of the piston and the passageway to the aperture 128 being blocked by the piston. Under these circumstances, therefore, all of the output of the pickup pump 20 will be delivered to the outlet port 42 from which it is conducted by conduits 58 and 60 through the filter 62 to the transverse passageway 64 of the main pump.

In the event that the output pressure of the pickup pump 20 tends to become excessive as a result of increased speed of the engine and/or decreased consumption of the fuel by the main pump, then the outlet pressure on the outlet side of the pickup pump 20 will be sufficient to cause the piston 130 to be forced a sufficient distance to uncover the aperture 126, this position being shown in Fig. 3 of the drawings. The piston 130, by movement responsive to fluid pressure, will vary the effective opening of the aperture 126 to maintain a substantially constant outlet pressure. The fuel released by the valve through the aperture 126, of course, is returned to the inlet side of the pickup pump.

In the event that it is desired to prime the pump before starting the same, it is a particular advantage of the valve of the present invention that it will automatically permit the priming fuel to by-pass the pickup pump 20 and immediately enter the conduit 58. As will be apparent when fuel under pressure is admitted to the inlet port 36 by any suitable priming means (not shown) the fuel will enter through the passageway 102 and aperture 128 to the rear of the piston 130, thereby forcing the piston to the dotted line position shown in Fig. 3 of the drawings. Movement of the piston 130 to this position, however, is restrained by engagement of the piston 130 with the end 121 of the spring 120. The length of piston 130 is such that sufficient priming fuel pressure must be applied to slightly compress the spring 120 in order to uncover the aperture 124. As soon as the aperture 124 is uncovered, which occurs automatically when fluid pressure is impressed on the inlet side, communication is established with the outlet port 42 through the bore 100. This is a very important advantage because the pickup pump 20 when stationary has a great resistance to fluid flow and would normally prevent a material flow of fluid through the pump even at very high input pressures.

After priming has been completed the pump may then be put in operation immediately without any adjustment thereof. As soon as the pump is rotated the resulting outlet pressure of the pickup pump 20 will immediately exceed the input pressure and the piston 130 will be returned to metering position for controlling the maximum pressure of the pump.

During the time that the pump is idle and when there is no priming operation being carried out, the piston 130 will be confined for free movement between the springs 120 and 132 so that it will cover either the aperture 124 or aperture 126 depending on its position. As a result leakage of fuel through the valve will be effectively prevented.

It thus will be seen that there has been provided in accordance with the invention a valve of simple and economical construction which will effectively limit the output pressure of the pickup pump and at the same time permit the priming of the pump by by-passing the pickup pump. These functions are carried out automatically responsive to fuel pressure and no manual adjusting or setting of the valve is required.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statement of the scope of the invention which, as a matter of language, might be said to fall therebetween.

I claim as my invention:

1. A valve for use with a fuel pump comprising means forming a valve chamber, said valve chamber being provided with means for communication with an outlet side of an associated pump comprising an orifice at one end and an orifice adjacent but spaced from said one end of the chamber and being provided with means for communication with an inlet side of an associated pump comprising an orifice at the opposite end and an orifice adjacent but spaced from said opposite end of the chamber, a piston slidably disposed in said chamber and of such size that its trailing edge will uncover both intermediate orifices when the piston is moved to the ends of the chamber, and a spring at each end of the chamber engageable by the piston for resiliently opposing movement of the piston to a position uncovering the intermediate openings.

2. A combination pressure relief and bypass valve comprising a valve chamber, a first fluid passageway communicating with one end of the valve chamber, a second fluid passageway communicating with the other end of the valve chamber, a plunger slidably mounted in the valve chamber for movement toward either end of the chamber responsive to a differential pressure on opposite sides of the piston, means forming a bypass from said one end of the valve chamber to the second fluid passageway which is closed when the piston is at said one end of the valve chamber and which is opened when the piston is at said other end of the valve chamber, and means forming a bypass from said other end of the valve chamber to the first fluid passageway which is closed when the piston is at said other end of the valve chamber and which is opened when the piston is at said one end of the chamber.

3. A combination pressure relief and bypass valve comprising a valve chamber, a first fluid passageway communicating with one end of the valve chamber, a second fluid passageway communicating with the other end of the valve chamber, a plunger slidably mounted in the valve chamber for movement toward either end of the chamber responsive to a differential pressure on opposite sides of the piston, means forming a bypass from said one end of the valve chamber to the second fluid passageway which is closed when the piston is at said one end of the valve chamber and which is opened when the piston is at said other end of the valve chamber, means forming a bypass from said other end of the valve chamber to the first fluid passageway which is closed when the piston is at said other end of the valve chamber and which is opened when the piston is at said one end of the chamber, and yieldable means opposing movement of the piston toward the ends of the chamber.

4. The valve set forth in claim 3 in which each of said means forming a bypass includes a port in the sidewall of the valve chamber communicating externally of the valve chamber with the respective fluid passageway, said ports having variable effective openings depending upon the position of the piston with respect to the ports.

5. A combination pressure relief and bypass valve comprising a valve chamber, a first fluid passageway communicating with one end of the valve chamber and with a port in the chamber spaced from said one end of the chamber, a second fluid passageway communicating with the other end of the valve chamber and with a port in the chamber spaced from said other end of the chamber, and a piston slidably mounted in the valve chamber for movement in either direction responsive to the differential in pressure at opposite ends of the valve chamber, said piston being dimensioned to permit fluid flow from the first passageway through said one end of the chamber to the port of the second passageway when the piston is moved toward said other end of the chamber by fluid admitted under pressure through said first passageway and to permit fluid flow from the second passageway through said other end of the chamber to the port of the first passageway when the piston is moved toward said one end of the chamber by fluid admitted under pressure through said second passageway.

6. A combination pressure relief and bypass valve comprising a valve chamber, a first fluid passageway communicating with one end of the valve chamber and with a port in the chamber spaced from said one end of the chamber, a second fluid passageway communicating with the other end of the valve chamber and with a port in the chamber spaced from said other end of the chamber, a piston slidably mounted in the valve chamber for movement in either direction responsive to the differential in pressure at opposite ends of the valve chamber, said piston being dimensioned to permit fluid flow from the first passageway through said one end of the chamber to the port of the second passageway when the piston is moved toward said other end of the chamber by fluid admitted under pressure through said first passageway and to permit fluid flow from the second passageway through said other end of the chamber to the port of the first passageway when the piston is moved toward said one end of the chamber by fluid admitted under pressure through said second passageway, and biasing means urging the piston to a position intermediate the ends of the valve chamber blocking said fluid flow from the ends of the chamber to the ports.

7. The valve set forth in claim 6 wherein said biasing means comprises a spring at each end of the chamber engageable by the piston.

8. A combination pressure relief and bypass valve comprising a valve chamber, a first fluid passageway communicating with one end of the valve chamber and with a first port in the valve chamber spaced from said one end of the chamber, a second fluid passageway communicating with the other end of the valve chamber and with a second port in the valve chamber positioned between said first port and the other end of the valve chamber, a piston slidably mounted in the valve chamber for movement in either direction responsive to the differential in pressure at opposite ends of the valve chamber, said piston being dimensioned to uncover the port closest to an end of the chamber when moved to an end of the chamber, and spring means opposing movement of the piston to either end of the chamber.

9. A combination pressure relief and bypass valve for a pump comprising a casing having an inlet and an outlet passageway for a pump, a valve chamber in said casing having one end and a first port spaced from said one end communicating with the inlet passageway and having its other end and a second port spaced from said other end communicating with the outlet passageway, a piston slidably mounted in the valve chamber for movement toward either end of the chamber responsive to fluid pressure on the piston, said piston being dimensioned to uncover the first port and thus permit fluid flow from the outlet passageway to the inlet passageway when the piston is moved to said one end of the chamber responsive to fluid pressure from the outlet passageway and to uncover the second port and thus permit fluid flow from the inlet passageway to the outlet passageway when the piston is moved to said other end of the chamber responsive to fluid pressure from the inlet passageway, and spring means opposing movement of the piston toward the ends of the chamber.

10. A combination pressure relief and bypass valve for a pump comprising a casing having an inlet and an outlet passageway for a pump, a bore in said casing extending between the passageways, an inner tube disposed in the bore, said tube having a smaller outer diameter than the inner diameter of the bore so as to form a space therebetween and having openings at each end communicating with the bore, means disposed between the tube and the bore intermediate the ends thereof forming a fluid seal therebetween, said inner tube having an orifice in its side wall on each side of the seal and spaced from the ends of the tube, a piston slidably mounted in the tube for movement toward either end of the tube responsive to fluid pressure on the piston, said piston being dimensioned to uncover both orifices when the piston is moved toward either end of the tube, and spring means opposing movement of the piston toward the ends of the tube.

(References on following page)

References Cited in the file of this patent

UNITED STATES PATENTS

| | | |
|---|---|---|
| 77,694 | Wilcke | May 5, 1868 |
| 868,680 | Martin | Oct. 22, 1907 |
| 1,110,567 | McAulay | Sept. 15, 1914 |
| 1,467,522 | Amsler | Sept. 11, 1923 |
| 1,470,804 | Buckingham | Oct. 16, 1923 |
| 1,795,386 | Beebe | Mar. 10, 1931 |
| 1,972,560 | Heller | Sept. 4, 1934 |
| 2,122,045 | Rose | June 28, 1938 |
| 2,126,874 | Deschamps | Aug. 16, 1938 |
| 2,157,089 | Storch | May 2, 1939 |
| 2,193,671 | Dolza | Mar. 12, 1940 |
| 2,219,488 | Parker | Oct. 29, 1940 |
| 2,263,548 | Mueller, Jr., et al. | Nov. 18, 1941 |
| 2,279,176 | Pardee | Apr. 7, 1942 |
| 2,354,791 | Boldt | Aug. 1, 1944 |
| 2,451,925 | Curtis | Oct. 19, 1948 |
| 2,460,397 | Roth | Feb. 1, 1949 |

FOREIGN PATENTS

| | | |
|---|---|---|
| 128,145 | Sweden | Mar. 2, 1950 |